(12) United States Patent
Abele

(10) Patent No.: US 10,762,810 B2
(45) Date of Patent: Sep. 1, 2020

(54) AUGMENTED REALITY EYEBOX FITTING OPTIMIZATION FOR INDIVIDUALS

(71) Applicant: North Inc., Ontario (CA)

(72) Inventor: Nicolas Abele, Lausanne (CH)

(73) Assignee: NORTH INC., Kitchener (CA)

( * ) Notice: Subject to any disclaimer, the term of this patent is extended or adjusted under 35 U.S.C. 154(b) by 64 days.

(21) Appl. No.: 15/968,033

(22) Filed: May 1, 2018

(65) Prior Publication Data

US 2019/0043392 A1 Feb. 7, 2019

Related U.S. Application Data

(60) Provisional application No. 62/614,282, filed on Jan. 5, 2018.

(51) Int. Cl.
| | |
|---|---|
| *G09G 3/00* | (2006.01) |
| *G06T 3/20* | (2006.01) |
| *G02B 27/01* | (2006.01) |
| *G09G 3/34* | (2006.01) |
| *G06T 11/60* | (2006.01) |
| *G02B 27/00* | (2006.01) |

(52) U.S. Cl.
CPC ......... *G09G 3/001* (2013.01); *G02B 27/0172* (2013.01); *G02B 27/0179* (2013.01); *G06T 3/20* (2013.01); *G09G 3/3406* (2013.01); *G02B 27/0093* (2013.01); *G02B 2027/0174* (2013.01); *G02B 2027/0178* (2013.01); *G02B 2027/0187* (2013.01); *G06T 11/60* (2013.01); *G06T 2200/24* (2013.01); *G09G 2320/0693* (2013.01); *G09G 2340/0478* (2013.01); *G09G 2354/00* (2013.01)

(58) Field of Classification Search
CPC ............... G09G 3/001; G09G 3/3406; G09G 2320/0693; G09G 2340/0478; G09G 2354/00; G02B 27/0172; G02B 27/0179; G02B 27/0093; G02B 2027/0174; G02B 2027/0178; G02B 2027/0187; G06T 3/20; G06T 11/60; G06T 2200/24

See application file for complete search history.

(56) References Cited

U.S. PATENT DOCUMENTS

| 2016/0133201 A1* | 5/2016 | Border ................. G02B 27/283 |
| | | 345/694 |
| 2017/0255016 A1* | 9/2017 | Tinch ................. G02B 27/0172 |
| 2018/0095278 A1* | 4/2018 | Masson .............. G02B 27/0172 |
| 2018/0101007 A1* | 4/2018 | Asai ........................ G09G 5/10 |
| 2018/0173303 A1* | 6/2018 | Liu .................... G02B 27/0025 |
| 2018/0182272 A1* | 6/2018 | McGlew ............... G09G 3/002 |

\* cited by examiner

*Primary Examiner* — Chong Wu

(57) ABSTRACT

In some embodiments, the disclosed subject matter involves a head worn device (HWD) for viewing augmented reality, or virtual images. A projector coupled to the HWD may use a microelectromechanical systems projector and project onto a holographic lens of the HWD. Images may be projected into an eyebox area that is deemed comfortable to the user, the eyebox area located in one of a plurality of vertically adjacent recording zones. The recording zone for projection may be selected by the user, or be automatically selected based on configuration parameters of the HWD. Horizontal correction of the eyebox may be included. In an embodiment, multiple horizontal images are displayed in the selected recording zone, in different wavelengths. Another embodiment adjusts horizontal shift of the projected image based on user inputs. Other embodiments are described and claimed.

13 Claims, 9 Drawing Sheets

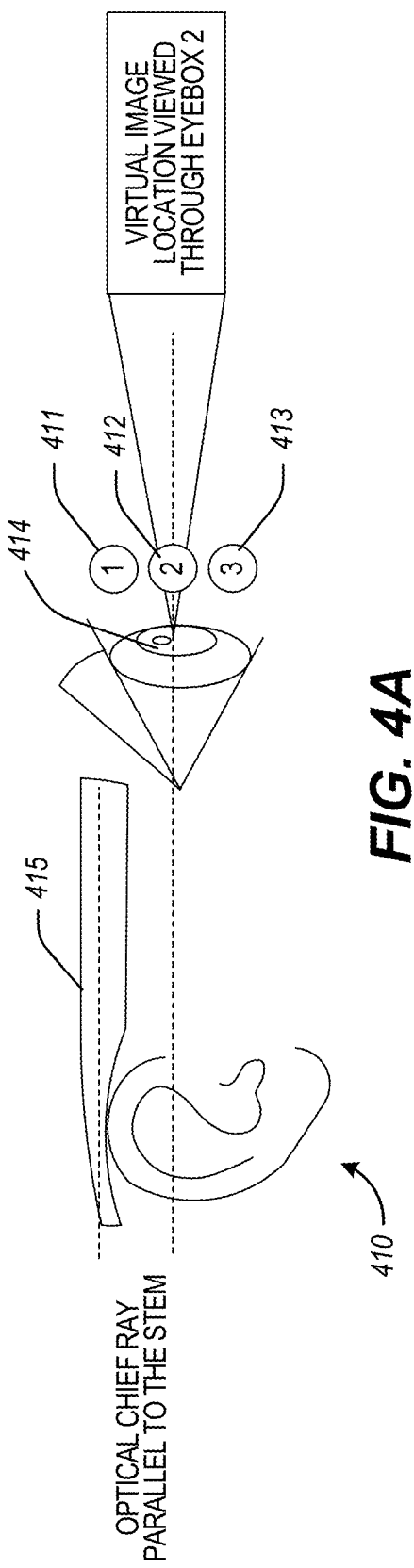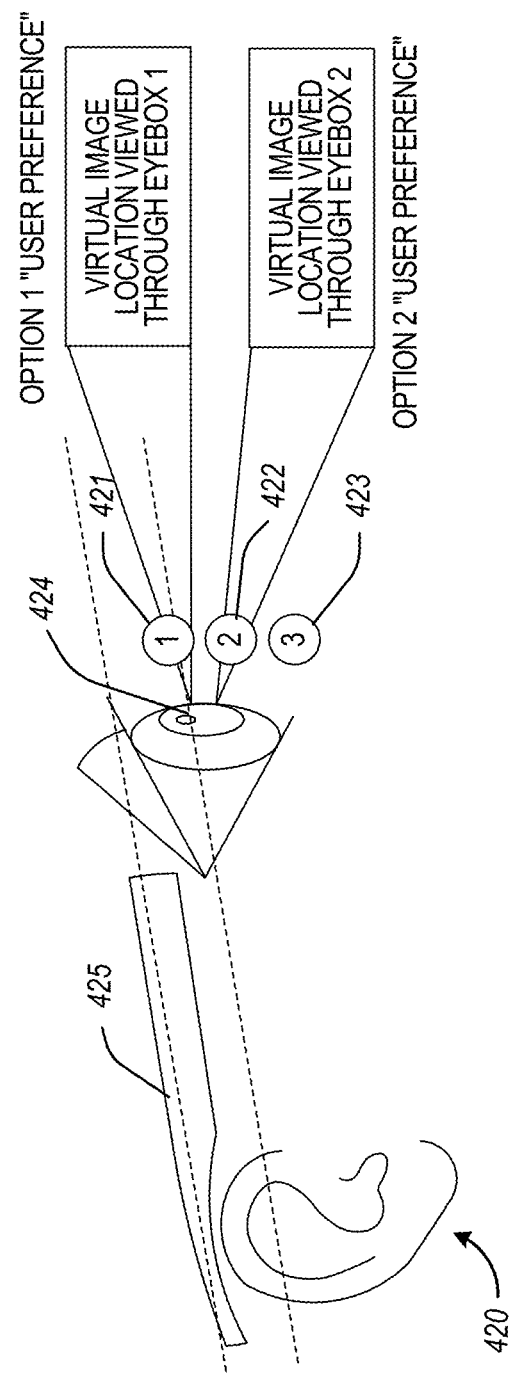

AUGMENTED REALITY EYEBOX FITTING OPTIMIZATION FOR INDIVIDUALS

RELATED APPLICATIONS

This application claims the benefit of priority under 35 U.S.C. 119(e) to U.S. Provisional Patent Application Ser. No. 62/614,282, filed Jan. 5, 2018, which is incorporated herein by reference in its entirety.

TECHNICAL FIELD

An embodiment of the present subject matter relates generally to adjusting the eyebox in a viewing device, and, more specifically but without limitation, to adjusting the eyebox in an augmented reality system accommodating user preferences and eyesight limitations.

BACKGROUND

Various mechanisms exist for viewing augmented reality (AR). Many existing systems use a viewer which may be referred to as a head mounted display (HMD), a head worn display (HWD), a heads-up display (HUD), a pair of adapted eyeglasses, smart eyeglasses, also referred to as smartglasses, or other device through which a user will look, or gaze. AR and Virtual Reality (VR) may differ in that while using an AR system, the user expects to be able to see the real world through the viewer, or glass, in addition to augmentation. This may also be referred to as see-through glasses or a see-through viewer. Thus, a usable viewer is either transparent (e.g., to see the actual real world), or will redisplay an image of the real world in real time, for the user. In addition to seeing the actual environment, the augmentations must be displayed in an area of the viewer that is both visible to the user (e.g., appropriate focal length and positioning for the user's pupil(s)), and not directly in the way or blocking key real world objects or information.

Images may be displayed on lens surface as a transmission computer generated hologram. The mathematics of computer generated holograms is well understood. Essentially, holography is made up of three elements: the image, a light source, and the hologram. If any two of those elements is known, the third can be computed. However, holographic displays in existing HWDs may be bulky and difficult to customize for an individual.

An identified problem with an HWD is to cope and compensate for various inter-pupillary distances (IPD) in the population. A typical user's IPD may range from 56 mm to 72 mm. Vertical misalignment may also be a problem for some users. Existing devices such as HoloLens™ available from Microsoft®, MagicLeap Lightwear™ glasses from Magic Leap, Smartglasses from ODG, Google Glass from Google X, and other HWDs, use classical optical components making their devices bulky, but typically adequate optically, for many users. While good optics are desirable, existing HWDs are big and bulky and uncomfortable for many users.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4A illustrates a virtual image location viewed through an eyebox, according to an embodiment;

FIG. 4B illustrates a virtual image location viewed through eyeboxes based on user preference, according to an embodiment;

DETAILED DESCRIPTION

Figure 1A:
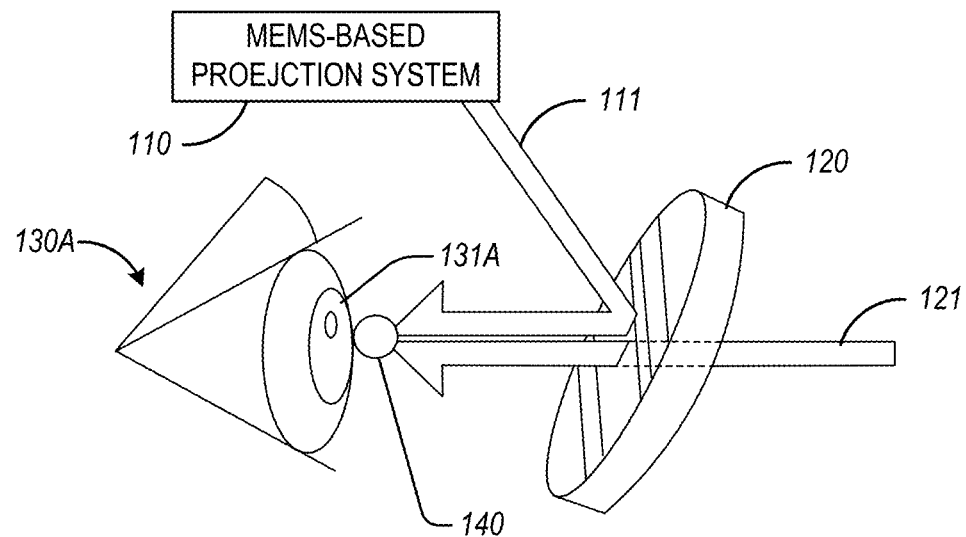
FIG. 1A illustrates the eyebox principal as it relates to augmented reality displays, according to an embodiment.

In the following description, for purposes of explanation, various details are set forth in order to provide a thorough understanding of some example embodiments. It will be apparent, however, to one skilled in the art that the present subject matter may be practiced without these specific details, or with slight alterations.

An embodiment of the present subject matter is a system and method relating to head worn displays (HWD) which may be used for augmented reality (AR), and have a comfortable form factor similar to regular eyeglasses. Embodiments described use a tightly architected projection system and electronics to result in an HWD that is just about the height of a normal pair of eyeglass. To accomplish this, the electronics are virtually invisible and the glass is about the same as a normal pair of eyeglasses in terms of size and weight, by using microelectromechanical systems (MEMS) holographic technology. MEMS holographic projectors are being used in some HWD devices. For instance, a scanning projection system may consists of a small etendue source such as a low power laser (e.g., a VCSEL, Vertical-cavity surface-emitting laser) or light emitting diode (LED), reflected from a resonant micro-electromechanical system (MEMS) scan mirror. For each position of the scan mirror a pixel may be formed on the retina through raster scanning. Various form factors of a MEMS projector may be utilized. Advantages of MEMS projectors are their size and low power requirements, thus, making them suitable for mounting on a pair of smartglasses.

In order to produce a small form factor HWD, the eyebox needs to be very small, due to the smaller optics footprint. In the context of vision, generally, and augmented or virtual reality eyewear, specifically, an eyebox is generally understood to be the volume of space within which an effectively viewable image is formed by a lens system or visual display, representing a combination of exit pupil size and eye relief distance. The virtual image, e.g., the augmented image, may only be seen when the user's pupil is looking at a specific position, or eyebox. It should be noted that the terms "virtual image" and "augmented image" are used interchangeably throughout this description. Outside of this eyebox, the image typically cannot be seen. Because of variances of inter-pupillary distance (IPD), existing systems found it difficult to design an HWD with an eyebox acceptable to most users, without making the eyebox larger. However, making the eyebox larger makes the HWD larger and heavier, to accommodate the projection system. Many users find these larger devices uncomfortable and not aesthetically pleasing. Moreover, not only is the IPD important for viewing the virtual image, but the eye to ear position alignment variation from one user to another may cause strong vertical misalignment of (1) the eyebox location and (2) the virtual image perceived location. For instance, poor eyebox location may result in a complete loss of the virtual image. Location of the augmentation may cause viewing problems when super-imposing virtual images in the user's field of view. In at least one embodiment, a new optical configuration is used to enable better fitting of wearable see-through glasses, coping for the human being (anthropomorphic) variability in terms of both inter-pupillary distance (IPD) and ear-to-eye variation.

In an embodiment, the MEMS projector is made to overscan the MEMS mirror to increase the area where an image may be displayed, e.g., the projection area. In an embodiment, the scanning angle of the MEMS mirror is increased to cover a wider area and moving position of the recording beam, in the factory. The scanning angle may be increased by injecting more current to the MEMS mirror without an increase in size or weight of the projector. Thus, the MEMS projector may project to a wider area without moving the projector. This increased projection area does not require the same kind of bulky hardware as existing systems use to increase the eyebox. The recording angles may be stored in memory (e.g., polymer memory) parameterizing memory volume. In an embodiment, a recording configuration is changed from one area to three areas.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

FIG. 1A illustrates the eyebox principal as it relates to augmented reality displays, according to an embodiment. In an augmented reality system a user 130A may view the real world 121 directly through an optic glass 120 (i.e., lens), such as a volume holographic transparent lens. It should be noted that a volume holographic lens may be used for one or more wavelengths, and a simple holographic lens may be used for a single wavelength. Lens 120 may include stacking of multiple layers of material. In an embodiment, the lens 120 may include an holographic optical element such as a lens, filter, beam splitter, diffraction grating, etc. and some other material including polycarbonate, glass, anti-reflective coatings, anti-scratching coatings, or polarized film, etc. In an embodiment, the holographic material in the stacked layers may be approximately 100 µm thick, whereas the entire lens 120 may be approximately 500 µm thick. A volume hologram is a hologram where the thickness of the recording material is much larger than the light wavelength used for recording. It will be understood that a variety of form factors may be used to manufacture the lens 120 that will properly reflect a holographic projection. For simplicity, lens 120 may be referred to as a holographic lens, herein. A projection system, such as may be implemented with a MEMs-based projection system 110, may project an augmented image 111 onto the lens 120 for reflection into the user's pupil 131A. An eyebox 140 is the location where the user may effectively see the virtual, or augmented image. Thus, for a user to comfortably see the augmented image, their pupil 131A must be properly aligned with the eyebox 140 created by the projection system 110.

Figure 1B:
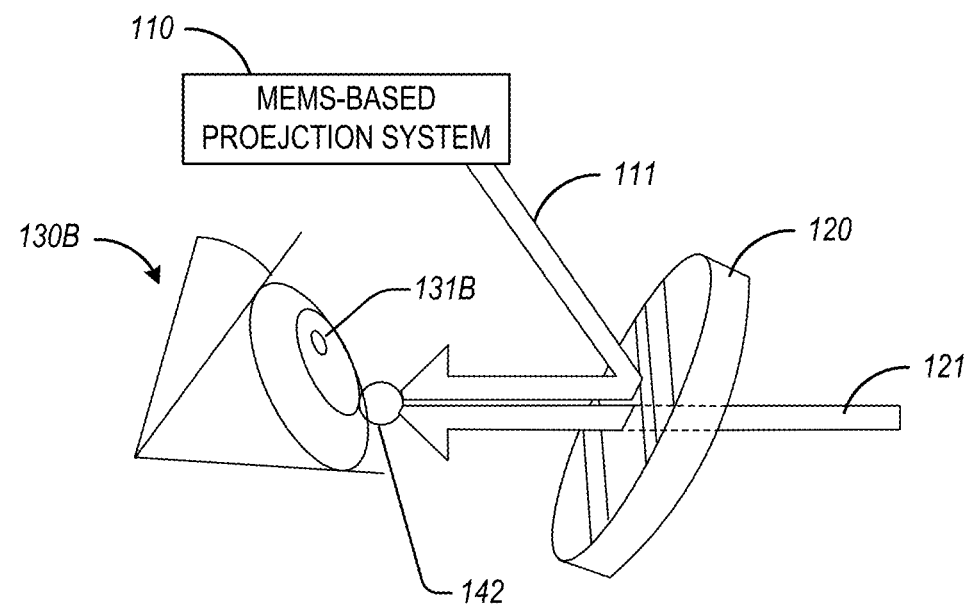
FIG. 1B illustrates vertical misalignment between the eyebox location and pupil location, according to an embodiment.

FIG. 1B illustrates vertical misalignment between the eyebox location and pupil location, according to an embodiment. In this example, the user 130B may be looking up slightly, or have the glasses worn at an angle. The real world image 121 continues to pass directly through the lens 120, albeit at an angle from the pupil 131B. The MEMS-base projection system 110 projects the augmented image 111 onto the lens 120, but the augmented image may not be seen by the user 130B. Because of the angle of reflection, the eyebox 142 for the augmented image does not line up with the pupil 131B. Thus, this virtual image 111 may not be viewable for some user's point of view. Some users may have a large pupil and see images when the pupil does not line up with the eyebox, but this is not typical. Enlarging the eyebox 142 may mitigate this problem, but typically at the cost of a much larger projection system.

Figure 2:
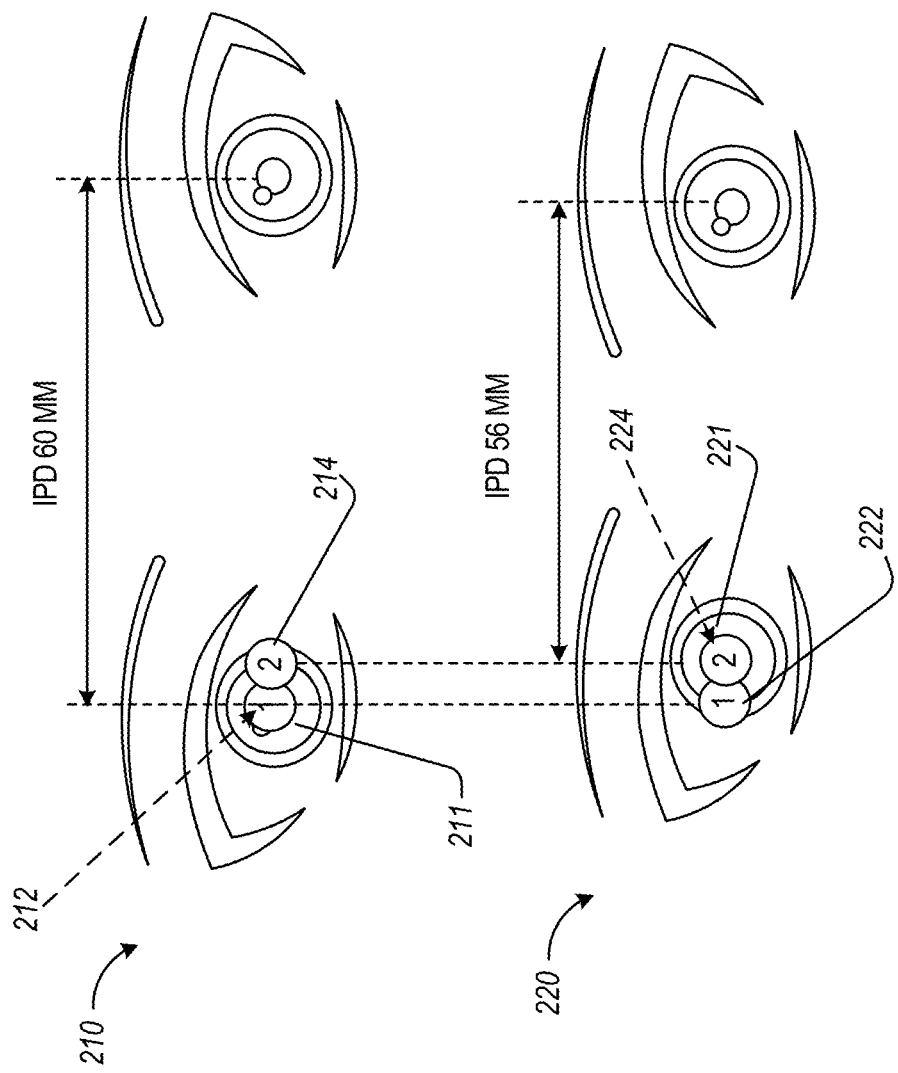
FIG. 2 illustrates eyebox issues with IPD variations among users, according to an embodiment.

FIG. 2 illustrates eyebox issues with IPD variations among users, according to an embodiment. In this example, user 210 has an IPD of 60 mm. User 220 has an IPD of 56 mm. Two eyeboxes are shown for each user, specifically eyeboxes 212, 214 for user 210, and eyeboxes 222, 224 for user 220. If both users 210, 220 wear the same HWD, it may be seen that the user 210 pupil 211 may be able to see using eyebox 212 (corresponding to eyebox 222 for user 220), but not eyebox 214 (corresponding to eyebox 224 for user 220). Similarly, because user 220 has a smaller IPD, pupil 221 may be able to see using eyebox 224 (corresponding to eyebox 214 for user 210), but not eyebox 222 (corresponding to eyebox 212 for user 210). It will be understood that the same device with the same smaller eyebox will not provide effective viewing for both users 210, 220.

A mechanism to address the variations in IPD may be found in Published Patent Application No. US2017/0293147 A1 (hereinafter, "Application '147") which provides a technical solution for enlarging the eyebox to account for IPD differences among users. A mechanism as discussed in Application '147 is a method for displaying an image viewable by an eye, the image being projected from a portable head worn display and comprises steps of: emitting a plurality of light beams of wavelengths that differ amongst the light beams; directing the plurality of light beams to a scanning mirror; modulating in intensity each one of the plurality of light beams in accordance with intensity information provided from the image, whereby the intensity is representative of a pixel value within the image; scanning the plurality of light beams in two distinct axes with the scanning mirror to form the image; and redirecting the plurality of light beams to the eye using a holographic optical element acting as a reflector of the light beams, whereby the redirecting is dependent on the wavelength of the light beam, to create for each light beam an exit pupil at the eye that is spatially separated from the exit pupils of the other light beams. This mechanism may help with minor variations; however, significant variance in vertical pupil location may require additional adjustment.

In an embodiment, a fixed projector may be combined with a properly recorded holographic semi-transparent (tinted or not) combiner lens to adapt the system to the user's IPD. This example may use volume holographic film. This holographic film may allow multiple different beams with various wavelength to illuminate the same location on the holographic film. But the various wavelengths may reflect at different angles due to the wavelength multiplexing of the volume hologram. In an embodiment, three beams having three wavelengths may be used to generate three lateral eyeboxes of the same image. The three eyeboxes overlap in the retina so that while moving the eye around one may switch smoothly from one eyebox to another eyebox. The use of these three lateral eyeboxes allow the user to smoothly view from one wavelength beam to another, thereby artificially expanding the eyebox size.

The mechanism in Application '147 may create multiple eyeboxes projected simultaneously at different wavelengths. The same image may be projected for each horizontal, or lateral eyebox. Thus, both user 210 and user 220 may be able to see the virtual image using the same HWD, albeit at a different wavelength eyebox. This implementation allows users with different IPDs to use the same HWD. However, the mechanism described in Application '147 may not account for vertical variances among users.

It should be understood that the method as discussed in Application '147 projects wavelength at different angles. In an embodiment, three wavelengths are reflected at different angles to the eye. However, this techniques is not fully scalable to many more than three eyeboxes because volume holography is not perfect. In other words, the wavelength changes the color slightly and using too many wavelength variations may produce unacceptable color shifts in the projected image, based on where it is viewed (e.g., at which angle). Thus, including additional vertical eyeboxes using additional wavelengths is not an optimal solution.

During test trials with a number of persons, the author found that ear-to-eye location and "horizontality" plays a significant fitting issue. Even though a user may have the correct holographic lens reflecting the image onto the correct IPD size, the user may (1) still not be able to see the image, and/or (2) see the virtual image to be located a sub-optimal or undesirable line-of-sight.

Figure 3:
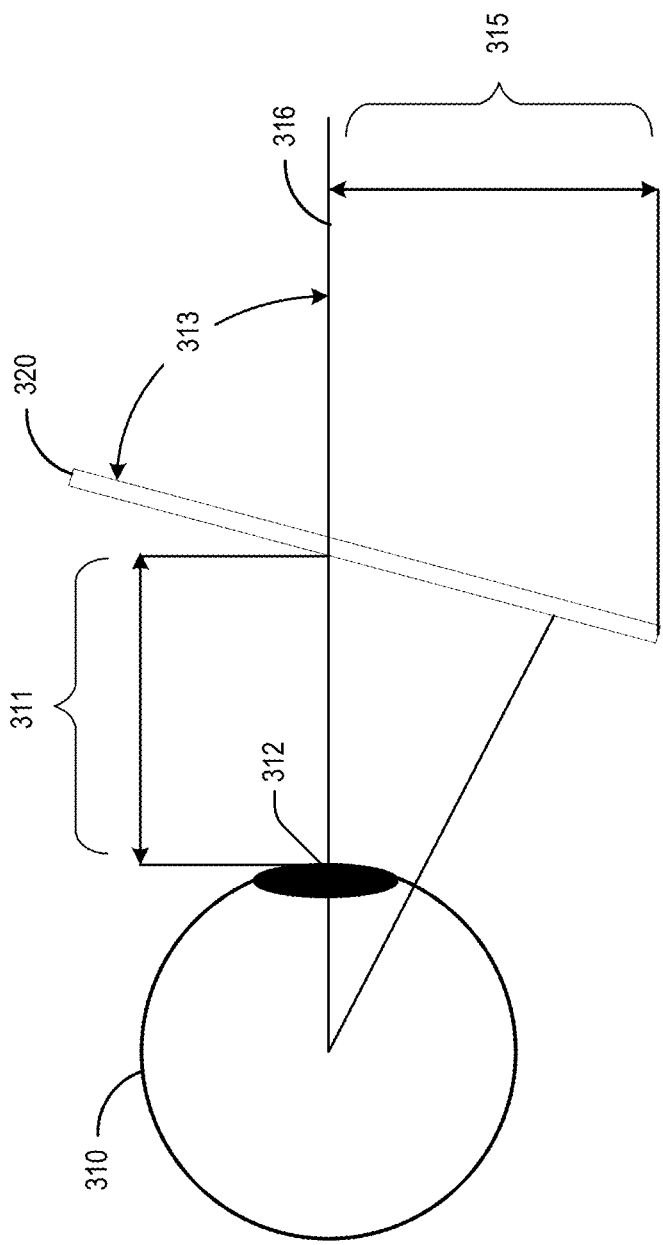
FIG. 3 illustrates some of the design parameters that define a given glass design, according to an embodiment.

From a pure glass design perspective, when using a single design frame shape, there is little margin for variance to compensate for vertical virtual image eyebox and position due to human body shape. FIG. 3 illustrates some of the design parameters that define a given glass design, according to an embodiment. Any modification of these parameters may result in a different glass design frame, so none of the parameters may effectively be used to compensate for all ear-to-eye horizontality variation. The user's eye 310 has a back vertex distance 311, also known as "eye relief," from the surface of the glass/lens 320. The back vertex distance 311 is the distance from the pupil 312 to the back of the lens 320 along the primary straight ahead gaze line 316. The angle of viewing, perhaps due to eyeglass tilt from ear or nose size/locations, or frame design, may result in a pantoscopic tilt angle 313. Pantoscopic tilt 313 is the angle of the eyewear lens 320 relative to the primary straight ahead gaze line 316. A fitting height 315 may depend on the height of the lens 320. A fitting height 315 is the vertical measurement between the pupil center 312 and the primary straight ahead gaze line 316 to the bottom of the lens 320. For instance, it will be understood that lenses below a certain height are not suitable for bifocals in prescriptive lenses. The same principal applies for augmented reality glasses—a certain fitting height may be necessary for the user to both see the real world image and an augmented image without obstruction or too much eye movement. For augmented reality, it may be necessary to overlay the virtual image content on top of the real world background, and therefore the fitting height may be important. The location of a viewable eyebox may depend on the pantoscopic tilt angle 313, and eye relief distance 311 from the lens 320 due to reflection angles and location of the projected image.

In an embodiment, to address the vertical misalignment of the fit due to ear-to-eye variations from person to person, multiple vertical zones in the holographic film of the lens may be defined. Thus, the system either records using volume multiplexing, or more classical surface holography. The projection system display parameters may be modified, so that the parameters result in multiple separated (non-overlapping) eyebox in the retina covering the entire population vertical fit. Embodiments enable the user to select the eyebox that best fits their vertical fit. In an embodiment, the vertical eyeboxes may either be non-overlapping, but vertically adjacent (e.g., one on top of the other), or slightly separated by a small number of pixels. In an embodiment, the vertical eyeboxes may be slightly overlapping by a small number of pixels, because the user will typically only use a single one of those eyeboxes. Thus, having the eyeboxes overlap creates a kind of smaller image position granularity than one eyebox to the other.

It will be understood that when the holographic lens is manufactured, an input recording angle may be stored in the polymer. Polymer memory may be manufactured with electrically conducting polymer (PEDOT) and may be denser and less expensive than flash memory. Polymer memory may be capable of storing a Mb of data in a $mm^2$ device. Polymer memory is typically a write once-read many device. Simply, a holographic lens is piece of plastic. When you shoot a laser at the plastic at a particular angle, polymer memory may be used to retain the recording input and recording beam angle. During use of the holographic lens, for instance, in a HWD, the recording input configuration may be retrieved from the polymer memory. The projector may be focused to project a light source at the same angle as the recording reflection angle so that an image may be viewed. For instance, in an example, the recording image position may be recorded as 20 degrees down. It will be understood that many other angles and configurations may be used, in practice.

FIG. 4A illustrates a virtual image location viewed through an eyebox, according to an embodiment. A first user 410 wears an HWD or glasses with an ear piece 415 that is almost horizontal, or parallel to the floor. Three eyeboxes 411, 412, and 413 may be available for viewing. In this example eyebox 412 is the most efficient eyebox to be seen through the user's pupil 414. However, a second user may prefer a different eyebox.

FIG. 4B illustrates a virtual image location viewed through eyeboxes based on user preference, according to an embodiment. A second user 420 may wear an HWD or glasses with an ear piece 425 that is at an angle, e.g., not parallel to the floor or perfectly horizontal. Eyeboxes 421, 422, and 423 may be projected for viewing by user's pupil 424. In this example, user 420 may prefer to see a virtual image in eyebox 421. But even if eyebox 421 is the most efficient, or a natural choice, user 420 might prefer to see the virtual image in eyebox 422. By changing the location where the user actually sees the virtual image, the user may be able to view the real world unobstructed. When the user wants to see the virtual image, the user may glance up or down to a selected eyebox. In an embodiment, the eyebox selection may be user selectable rather than automatic An embodiment utilizing selectable eyeboxes may be used in conjunction with the IPD adaption, as described in Application '147, to provide an HWD that may accommodate both horizontal and vertical variances in users, as well as allowing user selectable parameters. Other embodiments may implement only the vertical adjustment and user selections. Some embodiments utilize automatic eyebox selection, and may optionally allow the user to change the automatic selection.

Figure 5A:
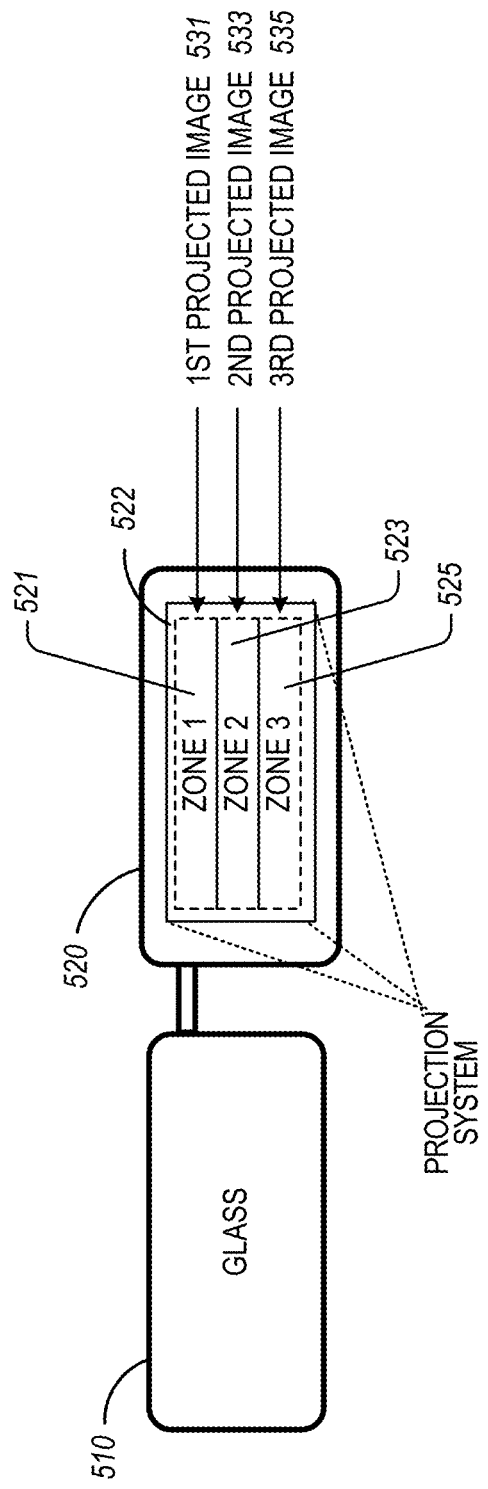
FIG. 5A illustrates an example recording implementation, according to an embodiment.

FIG. 5A illustrates an example recording implementation, according to an embodiment. In this example, a hologram may be recorded as a regular or volume hologram, but in different distinctive zones, and for each of those zones having a modified angular laser input recorder so that the output beam(s) from projection system 550 may be placed apart along the vertical axis. In other words, creating different zones for the same input beam to be redirected to various output beams may be performed by changing the position of the reference recording beam.

An embodiment modifies the recording physical setup, as compared to existing holographic projection systems. Effectively the last beam is moved apart so that the beam hits the hologram with a certain angle. In between the recording to the various vertical offset the other areas are hidden so that each area is effectively recorded with a specific incoming angle. Another embodiment records the holograms independently (e.g., the hologram alone is a kind of a thin plastic film) and then place the independent holograms on the lens side by side.

An example is shown with three recording zones 521, 523, and 525. An HWD may include a clear or prescriptive glass lens 510 for one eye, and a lens with integrated hologram projection capability 520, for the other eye. The lens 520 may have a MEMs-scanning projection area 522. In this example, three projected images 531, 533, 535 may be projected to the recording zones 521, 523, and 525, respectively. The projected images may typically be the same image so that the selection of eyebox area (e.g., which recording zone to view) will result in the user seeing the same image, but in a different location in the lens 520.

Recording of those zones 521, 523, 525 may be performed in several ways. In a first embodiment, x images may be recorded at the same time, where x is the number of recording areas. Images may be recorded with x recording/reference light sources, all fixed at predetermined positions with respect to the others, with one source (or set of sources, respectively, if multiple IPD coverage is implemented) for each area.

In a second embodiment, images may be recorded at x different times, hiding successively the zone, and recording one zone after the other. This technique has the advantage of requiring only one recording/reference light source. It will be understood that reference light sources are expensive, so this implementation may be less expensive to implement. In between each of the recordings, the reference source may then be moved to the required new recording position.

In a third embodiment, the lens may comprise three distinctive hologram films, recorded separately and then assembled inside the lens. This implementation has the advantages of removing the risk of parasitic light between the recording zones.

In embodiments, the projection system may project as many images as there are recording areas/zones, such that each of the images is redirected towards a different vertical eyebox location. In an embodiment, the MEMS-scanning projector may scan a larger field in the vertical axis and "paint" the images successively, and in a continuous scan, into each recording zone. A scan from top to bottom of the cumulative vertical recording zones may be considered to be a complete scan pass. It will be understood that a bottom to top, left to right, right to left or other scan pattern may be used, in practice. In the illustration shown in FIG. 5A, three recording zones 521, 523, 525 are shown. It will be understood by one of skill in the art upon reviewing the disclosure herein, that more or fewer than three recording zones may be used. In an embodiment, the three zones 521, 523, 525 are part of one projection area 522. Thus, the recording zones may be projected in a single scan to the projection area, in succession, as if one image was being projected. As long as a recording zone is projected in at least 30 Hz, a user should be able to see the image. However, projection of at least 60 Hz may be used to mitigate the appearance of flicker. The number of recording zones may depend on the height of the lens, the fitting height, scan rate, or average pupil size. Those users with large pupils may naturally be able to view multiple eyeboxes. Thus, the recording zones typically need to be of sufficient height so that the user will see only one at a time, to avoid double images or shadow images.

In another embodiment, it may be desirable for a user to see more than one eyebox, depending on the goals of the augmented reality system. If one eyebox per user/per glass is desired, then one image may be displayed. This embodiment prevents double images. However, other embodiments allow the user to see different images in two or more eyeboxes. In this case, each desired image may continue to be projected in its respective eyebox. The user will need to change their gaze location, however, to see the different images. In another embodiment, the image may be projected into all available eyeboxes so that the user may see the image regardless of gaze direction. When different images are projected into different eyeboxes, it may be important that the eyeboxes do not overlap.

In an embodiment, different images may be projected into different recording zones. For instance, if the user launches an application for bicycling, the application may automatically select recording zone 523 as a default, assuming that the user will be looking straight ahead into the distance, while cycling. For a cooking application, recording zone 525 may be selected as the default to accommodate a user looking downwards at the cookbook or kitchen work surface. An embodiment may allow the user to select the preferred recording zone using a user interface application in communication with the HWD, or using physical or virtual buttons on the HWD, to be discussed more fully, below.

In an embodiment, the HWD may be fitted with eye gaze technology (not shown). The HWD may be trained or configured for the user for various eye movement, head tilt, or application scenarios. The HWD may also be fitted with a gyroscope to identify head tilt. In an embodiment, the HWD may identify when the user is gazing upward, or downward, and automatically adjust the projected recording area. In an embodiment, recording areas not being viewed or selected may be disabled. The projector may scan through the recording zones, but turn the projector (e.g., light source) off for the disabled recording areas. Disabling of recording zones not being viewed will save on power for the device, because only one light source will be used to paint the image in a single eyebox.

In an embodiment, an optimization mechanism allows the user to first fit the device, with or without explicit selection of the eyebox area. When the eyebox is selected (e.g., the natural eyebox or a selected eyebox), other eyebox images, e.g., in different recording zones, may be disabled. When implemented with the IPD mechanism, as discussed above, there may be additional horizontal eyeboxes painted to accommodate the variances in IPD, but only one vertical recording zone enabled.

In an embodiment combining both the IPD and vertical adjustment, the vertical positioning of the eyebox, in addition to the horizontal implementation for the IPD compensation, may utilize the following recording implementation. A recording implementation effectively combines both volume holographic recording technique (and limitation, due to wavelength-based light cross talk for example) and surface-based holographic techniques. For instance, each time a multiple wavelength at a specific position on the lens is recorded, the hologram is recorded x times, where x is the number of wavelengths. For example, a volume hologram may be recorded three times at three independent positions on the lens/hologram.

Figure 5B:
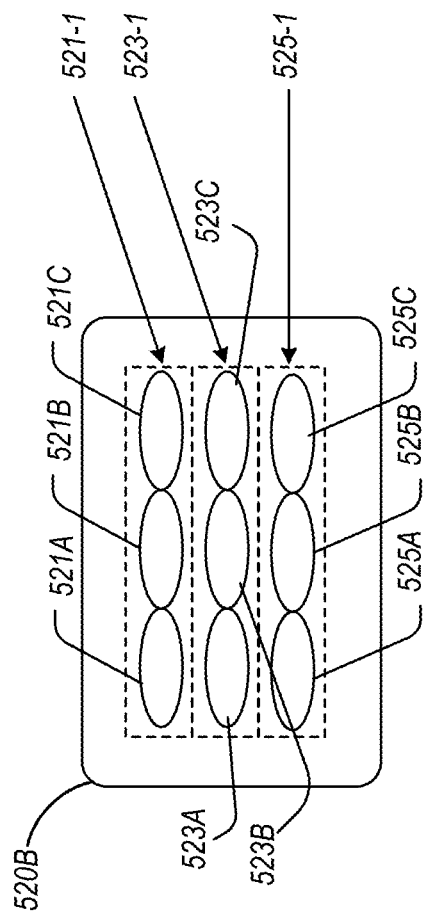
FIG. 5B illustrates a vertical and horizontal adaption of eyeboxes, according to an embodiment.

FIG. 5B illustrates a vertical and horizontal adaption of eyeboxes, according to an embodiment. As discussed above, three vertical eyeboxes, or recording zones, 521-1, 523-1, and 525-1 may be available for the lens 520B, similar to zones 521, 523, 525 in FIG. 5A. In this example, zone 521-1 may also include three horizontal eyeboxes 521A-C. As discussed above, horizontal zones may be projected with different wavelengths onto a volume holographic lens to accommodate variances in user IPD. Similarly, vertical zone 523-1 may include three horizontal eyeboxes 523A-C. And vertical zone 525-1 may include three horizontal eyeboxes 525A-C. As discussed above, once a vertical zone has been selected, for instance zone 523-1, zones 521-1 and 525-1 may be disabled. Thus, when a virtual image is projected onto lens 520B three wavelengths of the image are displayed simultaneously to horizontal zones 523A-C. In this embodiment, the user's head tilt, vertical preference and personal IPD may be accommodated. Further, as the user tracks left and right, the virtual image may smoothly transition back and forth from eyeboxes 523A, 523B, 523C.

Figure 6:
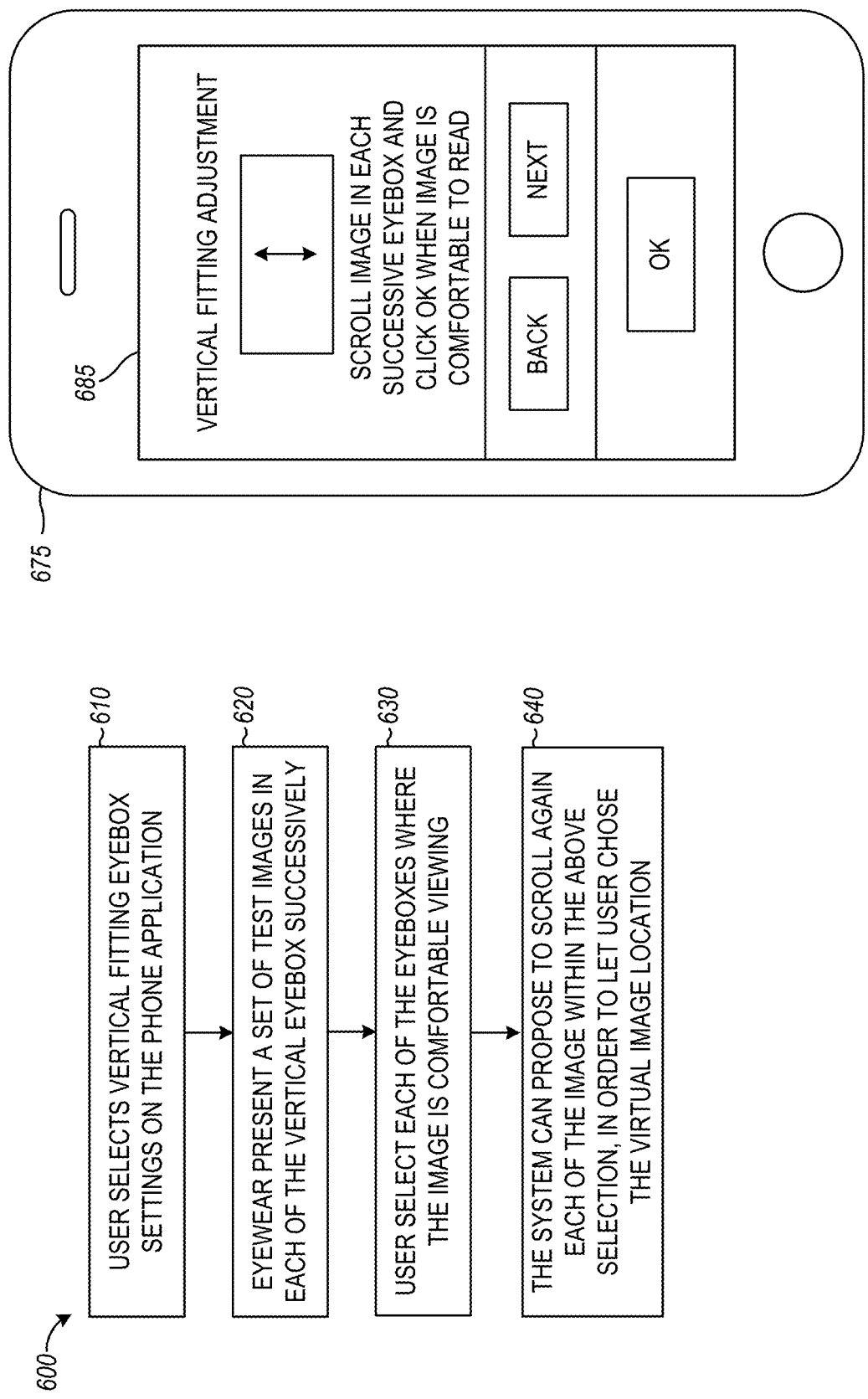
FIG. 6 is a flow diagram illustrating a manual fitting method, according to an embodiment.

FIG. 6 is a diagram illustrating a manual fitting method 600, according to an embodiment. In an embodiment, a user may utilize a mobile device, or other compute node, 675 to manually select a vertical fitting eyebox. A user may launch a vertical fitting adjustment application 685 with a graphical user interface component. The user may select vertical fitting eyebox settings in the application at block 610. The eyebox fitting application communicates with the HWD. In an embodiment, responsive to the launch of the fitting application 685, the HWD may present a set of test images in each of the vertical eyeboxes, successively, in block 620. The user may select each of the eyeboxes where the image is comfortably viewed, in block 630. The user may also provide feedback if none of the images is viewable, and the application 685 may give the user advice on head tilt, eyewear adjustments, etc., until the user is able to see the virtual image in at least one eyebox. Once the viewable eyebox(es) are identified, the fitting application may scroll through the images again for the viewable eyeboxes, and allow the user to select a preferred eyebox, in block 640. If only one eyebox is viewable, block 640 may optionally be skipped and the viewable eyebox may be automatically selected for the user. It will be understood that when the HWD implements the IPD mechanism, as described above, that an adjustments or configuration for horizontal eyeboxes may not be necessary, because all horizontal eyeboxes may be projected in different wavelengths. However, an initial IPD measurement of the user may be sent to the HWD as a baseline estimate.

Figure 7:
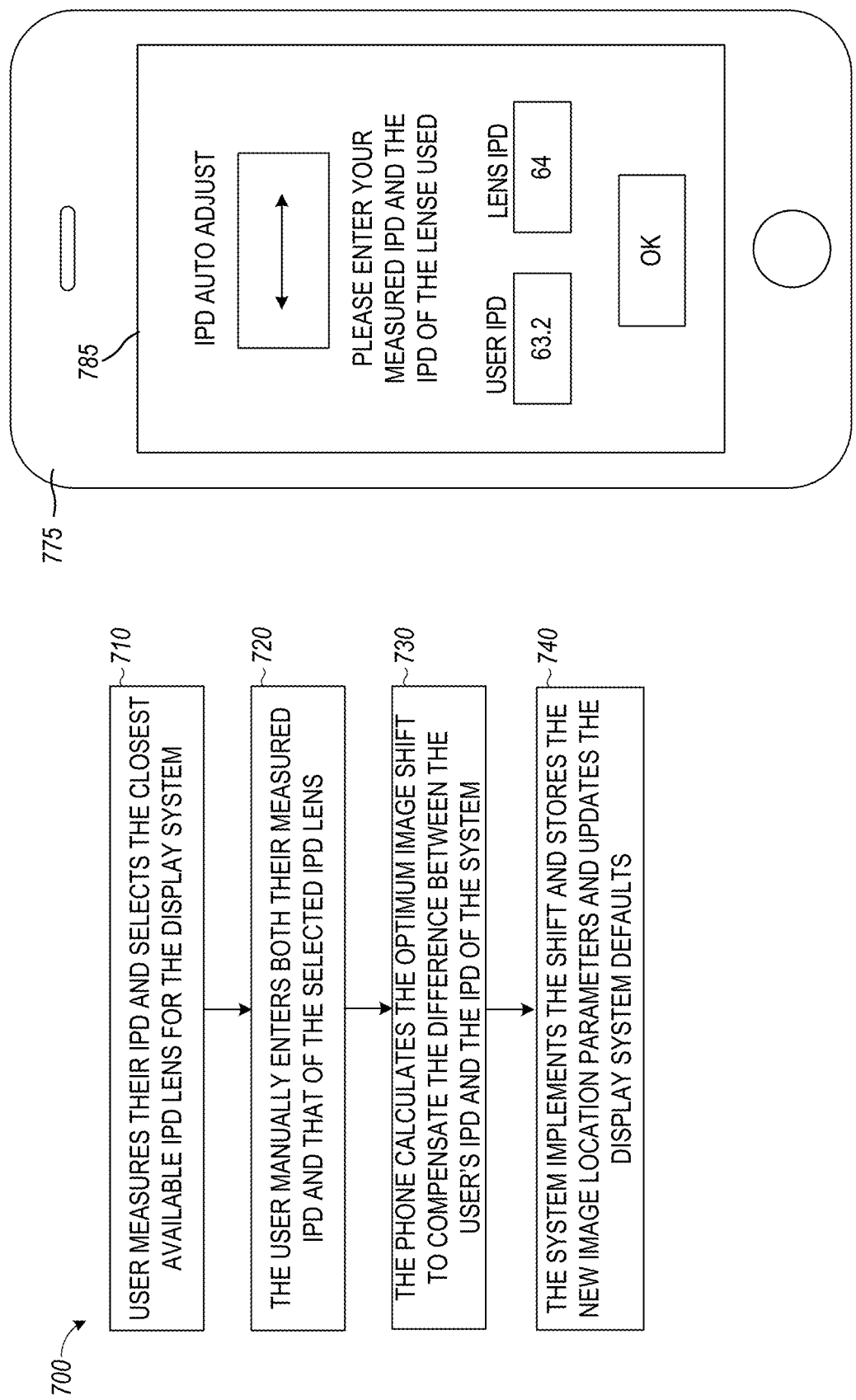
FIG. 7 is a flow diagram illustrating an automatic adjustment method, according to an embodiment.

FIG. 7 is a diagram illustrating an automatic adjustment method 700, according to an embodiment. In an embodiment, a user may utilize a mobile device, or other compute node, 775 to allow the HWD to automatically select a horizontal fitting eyebox, appropriate for the user IPD. A user may launch an automatic fitting adjustment application 785 with a graphical user interface (GUI) component. The user may measure their IPD and select the closest available IPD lens for the display system, in block 710. The user may manually enter both their measured IPD and that of the selected lens, in block 720. In practice, a user may receive their IPD measurement from an optometrist or other specialist. If this known measurement is not available, a user may use a ruler specialized for IPD measurements to determine their IPD. An HWD may be bundled with an inexpensive ruler and instructions for the user, if desired. In an example, the user may have an IPD of 63.2 mm, but the lens may have an available IPD of 64 mm. The lens may have multiple IPD options, which may be selected in a drop down box or other method, in the GUI. The fitting application 785 may calculate the optimum image shift to compensate the difference between the user's IPD and the IPD of the system, in block 730. The HWD system may implement the shift and store the new image location parameters and updates the display system defaults, in block 740. A horizontal, or lateral, IPD adjustment may typically be applied before vertical adjustment, for a better fit.

In an embodiment, adjustments for eyeboxes may be performed dynamically, after an initial configuration. For instance, a user may have selected a center eyebox based on comfort, but is using an application that requires head movement. A gaze tracker and/or gyroscope in the HWD may identify a horizonal and vertical movement or change in gaze and automatically adjust the projected eyebox. When using the IPD mechanism of Application '147, horizontal eye movement may not be affected due to transitioning from one wavelength eyebox to another. Eye gaze changes in a horizontal movement may identify an optimal horizontal eyebox, when implemented, but may be difficult to assess. In an embodiment, one or more of the projected wavelengths may be disabled based on the user's apparent gaze location. In an embodiment, the HWD may have a physical or virtual button that when pressed may initiate a change in eyebox. When initiated, the adaption may be automatic, or provide interactive prompts to the user to determine the desired changes. The interaction may be part of the experience with the HWD, e.g., prompts appearing in a viewable location on the lens, or part of a GUI on a connected device.

Figure 8:
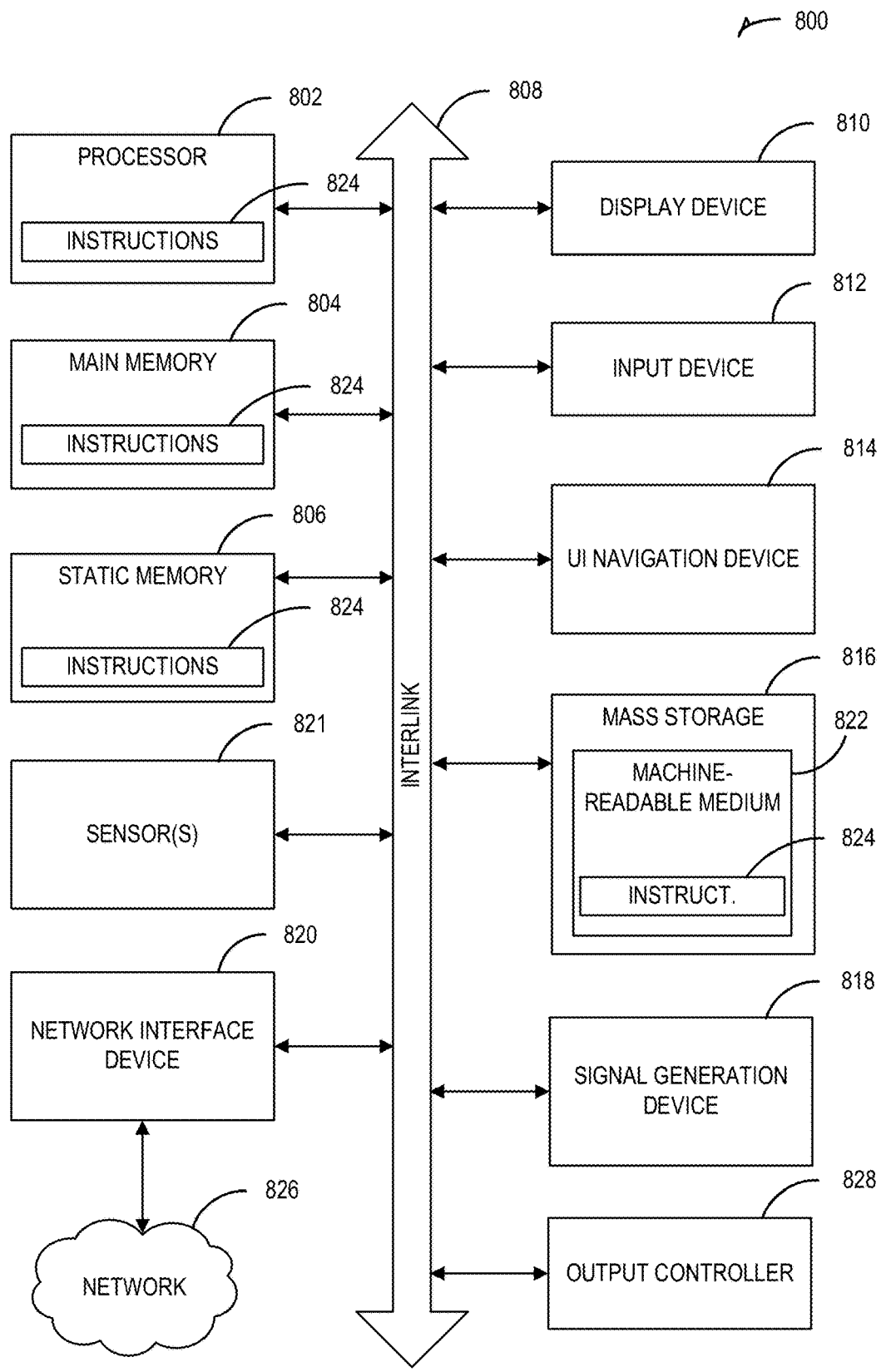
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. Machine 800 may be used to implement the GUI applications for fit adaption, or as a server in communication with HWD to provide the AR images. It will be understood that the HWD may include some components of machine 800, but not necessarily all of them. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Figure 9:
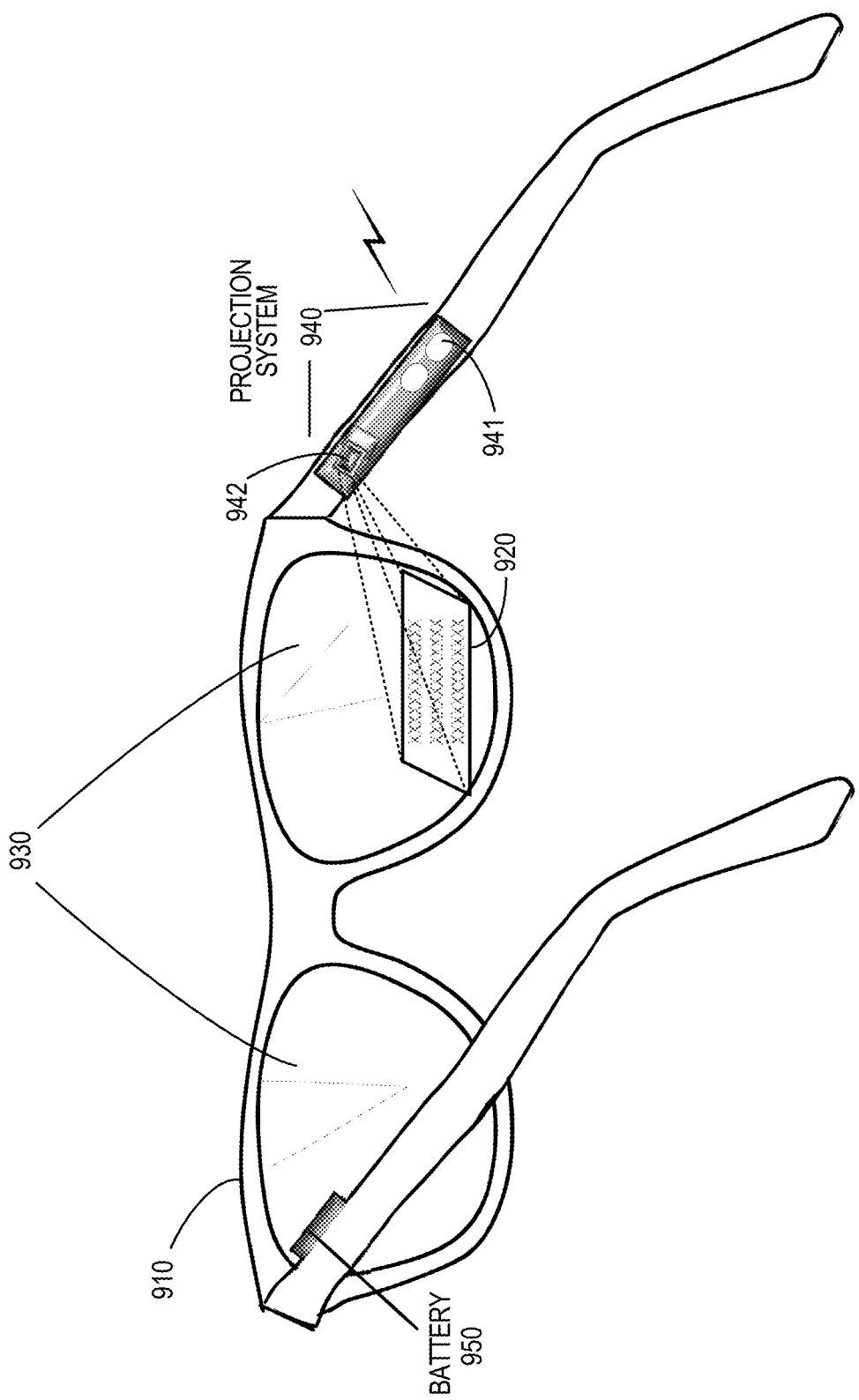
FIG. 9 illustrates a head worn device in the form of smartglasses, according to an embodiment.

FIG. 9 illustrates a head worn device in the form of smartglasses, according to an embodiment. In an embodiment, the smartglasses 910 are not much bigger or heavier than a regular pair of eyeglasses. Therefore, a user may feel more comfortable wearing them, both physically and aesthetically. In an embodiment, smartglasses 910 include a battery 950. It will be understood that the battery 950 may be replaceable or rechargeable via wired or wireless means. The battery 950 may provide power to the projection system 940 via wires embedded in the plastic frame, and therefore unseen. A MEMS projection system 940 may communicate wirelessly to a server or mobile device to receive AR content for display. The MEMS projection system 940 may be coupled to physical buttons or switches 941, for instance for power or other controls. The MEMS projector 940 includes at least one light source 942. As discussed above, the MEMS projector system 940 may retrieve the recording information from polymer memory to project the light source at the appropriate angle for AR content 920. In the example shown, the user views real world images through the transparent holographic lenses 930, and may view the AR content 920 when gazing down. In an embodiment, the MEMS projection system 940 may be coupled to a gaze tracker. The gaze tracker differs from the projection system 940 because it is effectively a camera system aimed at the user's eye rather than the lens to determine at what angle the user's gaze is directed. The gaze tracker may be integrated with the projector system 940 using a non-visible laser to the projection system that shines light onto the eye and the reflected light, reflected by the eye, reaches a photosensor, such as a photodiode, placed as well in the projection system. In another embodiment, the gaze tracker may be separate from the projector system 940, but in communication with components on the smartglasses 910. The gaze tracker may use a frame of reference angle based on the mounting configuration on the smartglasses 910.

Additional Notes and Examples

Examples may include subject matter such as a method, means for performing acts of the method, at least one machine-readable medium including instructions that, when performed by a machine cause the machine to performs acts of the method, or of an apparatus or system for adjusting the eyebox of a head worn display displaying augmented images, according to embodiments and examples described herein.

Example 1 is a head worn device for providing virtual images to a user, comprising: a holographic lens coupled to the head worn device, the holographic lens positioned to enable the user to view a virtual image on the holographic lens; and a projector coupled to the head worn device to project the virtual image onto the holographic lens in a projection area of the holographic lens, wherein the projection area includes at least two vertically adjacent recording zones, and wherein the projector is to project the virtual image into the at least two vertically adjacent recording zones, wherein an eyebox for the user is based in part on a pantoscopic tilt angle of the user's pupil with respect to the holographic lens, and an eye relief distance measurement of the user's eye surface with respect to the holographic lens, and wherein the eyebox corresponds to at least one of the at least two vertically adjacent recording zones.

In Example 2, the subject matter of Example 1 optionally includes wherein the projector is a microelectromechanical system using holographic technique for projection.

In Example 3, the subject matter of any one or more of Examples 1-2 optionally include wherein responsive to a selection of one of the at least two vertically adjacent recording zones that corresponds to the eyebox, disabling projection into each vertically adjacent recording zone that has not been selected, wherein disabling is to turn off a light source of the projector when projecting into unselected recording zones.

In Example 4, the subject matter of Example 3 optionally includes wherein the projecting into the projection area is to paint a continuous scan into the projection areas, wherein a complete scan pass includes painting the virtual image successively in one pass for each of the vertically adjacent recording zones in the projection area, and wherein disabling of a recording zone is to turn off the light source during the scan of the unselected recording zones, and turn on the light source during the scan of the selected recording zone in each scan pass.

In Example 5, the subject matter of any one or more of Examples 1-4 optionally include wherein responsive to a selection of more than one of the at least two vertically adjacent recording zones that corresponds to the eyebox, disabling projection into each vertically adjacent recording zone that has not been selected, wherein disabling is to turn off a light source of the projector when projecting into unselected recording zones.

In Example 6, the subject matter of Example 5 optionally includes wherein the more than one of the at least two vertically adjacent recording zones is selected, responsive to an indication that the user is able to see the more than one of the at least two vertically adjacent recording zones, and wherein the projector is to project a different image to at least one of the selected vertically adjacent recording zones.

In Example 7, the subject matter of any one or more of Examples 1-6 optionally include wherein selection of the vertically adjacent recording zone corresponding to the eyebox is responsive to receiving a user selection.

In Example 8, the subject matter of Example 7 optionally includes wherein selection of a horizontal location of the eyebox for projection in the selected vertically adjacent recording zone is based on a received horizontal image shift information corresponding to the user's inter-pupillary distance.

In Example 9, the subject matter of any one or more of Examples 7-8 optionally include wherein the eyebox location is to be dynamically adjusted, responsive to identifying eye gaze or head tilt of the user.

In Example 10, the subject matter of any one or more of Examples 1-9 optionally include wherein selection of the vertically adjacent recording zone corresponding to the eyebox is performed automatically.

In Example 11, the subject matter of any one or more of Examples 1-10 optionally include wherein the projector further comprises: a wavelength generator to project the virtual image onto at least two horizontally adjacent areas in each vertically adjacent recording zone, wherein the projection to each horizontally adjacent area is at a wavelength different from another horizontally adjacent area in the same vertically adjacent recording zone.

In Example 12, the subject matter of Example 11 optionally includes wherein responsive to a selection of one of the at least two vertically adjacent recording zones that corresponds to the eyebox, disabling projection into each vertically adjacent recording zone that has not been selected, wherein disabling is to turn off a light source of the projector when projecting into unselected recording zones, and continuing to project into each of the horizontally adjacent areas in the selected recording zone to accommodate left and right movement of the user's gaze.

In Example 13, the subject matter of Example 12 optionally includes wherein the projecting into the projection area is to paint a continuous scan into the projection areas, wherein a complete scan pass includes painting the virtual image successively in one pass for each of the vertically adjacent recording zones in the projection area, and wherein disabling of a recording zone is to turn off the light source during the scan of the unselected recording zones, and turn on the light source during the scan of the selected recording zone in each scan pass.

In Example 14, the subject matter of any one or more of Examples 11-13 optionally include wherein selection of the vertically adjacent recording zone corresponding to the eyebox is responsive to receiving a user selection, and wherein the user selection also includes information corresponding to the user's inter-pupillary distance.

In Example 15, the subject matter of any one or more of Examples 11-14 optionally include wherein selection of the vertically adjacent recording zone corresponding to the eyebox is performed automatically.

In Example 16, the subject matter of any one or more of Examples 1-15 optionally include wherein the holographic lens is positioned so that a first eye of the user may view the eyebox, and wherein the head worn device further comprises, a second optical lens for a second eye of the user, and wherein projection to the eyebox is based at least on an inter-pupillary distance for the first and second eye of the user, optics characteristics of the head worn device, and user preferences.

Example 17 is a method for adapting fit of a head worn device, comprising: presenting a user of a head worn device with a series of test images, the test images to be projected in at least two vertically adjacent recording zones of the head worn device; responsive to identification by the user, in a graphical user interface communicatively coupled to the head worn device, which images of the series of test images are seen by the user as projected in the head worn device, determining an eyebox location of the head worn device, based on which images are seen by the user; and sending the eyebox location to the head worn device to enable the head worn device to update configuration parameters associated with projection locations.

In Example 18, the subject matter of Example 17 optionally includes presenting the user with input fields in the graphical user interface, the input fields enabling entry of an inter-pupillary distance corresponding the user, and an inter-pupillary distance parameter associated with a configuration of the head worn device; responsive to entry into the input fields, calculating an horizontal image shift to compensate for differences in the user's inter-pupillary distance entered and the inter-pupillary distance parameter associated with the configuration of the head worn device; and sending the horizontal image shift to the head worn device to enable the head worn device to update configuration parameters associated with horizontal projection locations.

In Example 19, the subject matter of Example 18 optionally includes wherein the entry of an inter-pupillary distance is performed before presenting the user with the series of test images.

In Example 20, the subject matter of any one or more of Examples 17-19 optionally include presenting the user of the head worn device with a second series of test images, the test images to be projected in at least two vertically adjacent recording zones of the head worn device; repeating the determining of the eyebox location and sending the eyebox location, based in part on user responses to the second series of test images.

Example 21 is at least one non-transitory computer readable medium having instructions stored thereon, the instructions when executed on a machine cause the machine to: present a user of a head worn device with a series of test images, the test images to be projected in at least two vertically adjacent recording zones of the head worn device; determine an eyebox location of the head worn device, based on which images are seen by the user, responsive to identification by the user, in a graphical user interface communicatively coupled to the head worn device, which images of the series of test images are seen by the user as projected in the head worn device; and send the eyebox location to the head worn device to enable the head worn device to update configuration parameters associated with projection locations.

In Example 22, the subject matter of Example 21 optionally includes instructions to: present the user with input fields in the graphical user interface, the input fields enabling entry of an inter-pupillary distance corresponding the user, and an inter-pupillary distance parameter associated with a configuration of the head worn device; calculate an horizontal image shift to compensate for differences in the user's inter-pupillary distance entered and the inter-pupillary distance parameter associated with the configuration of the head worn device, responsive to entry into the input fields; and send the horizontal image shift to the head worn device to enable the head worn device to update configuration parameters associated with horizontal projection locations.

In Example 23, the subject matter of any one or more of Examples 21-22 optionally include instructions to: present the user of the head worn device with a second series of test images, the test images to be projected in at least two vertically adjacent recording zones of the head worn device; repeat the instructions to determine the eyebox location and send the eyebox location, based in part on user responses to the second series of test images.

Example 24 is at least one non-transitory computer readable medium having instructions stored thereon, the instructions when executed on a head worn device cause the head worn device to: project a virtual image on a holographic lens in a projection area of the holographic lens, wherein the projection area includes at least two vertically adjacent recording zones, and wherein the projector is to project the virtual image into the at least two vertically adjacent recording zones, wherein an eyebox for the user is based in part on a pantoscopic tilt angle of the user's pupil with respect to the holographic lens, and an eye relief distance measurement of the user's eye surface with respect to the holographic lens, and wherein the eyebox corresponds to at least one of the at least two vertically adjacent recording zones.

In Example 25, the subject matter of Example 24 optionally includes instructions to disable projection into each vertically adjacent recording zone that has not been selected, wherein disabling is to turn off a light source of the projector when projecting into unselected recording zone, responsive to a selection of one of the at least two vertically adjacent recording zones that corresponds to the eyebox.

Example 26 is a system for adapting fit of a head worn device, comprising: means for presenting a user of a head worn device with a series of test images, the test images to be projected in at least two vertically adjacent recording zones of the head worn device; means for determining an eyebox location of the head worn device based on which images are seen by the user, responsive to identification by the user, in a graphical user interface communicatively coupled to the head worn device, which images of the series of test images are seen by the user as projected in the head worn device; and means for sending the eyebox location to the head worn device to enable the head worn device to update configuration parameters associated with projection locations.

In Example 27, the subject matter of Example 26 optionally includes means for presenting the user with input fields in the graphical user interface, the input fields enabling entry of an inter-pupillary distance corresponding the user, and an inter-pupillary distance parameter associated with a configuration of the head worn device; means for calculating an horizontal image shift to compensate for differences in the user's inter-pupillary distance entered and the inter-pupillary distance parameter associated with the configuration of the head worn device, responsive to entry into the input fields; and means for sending the horizontal image shift to the head worn device to enable the head worn device to update configuration parameters associated with horizontal projection locations.

In Example 28, the subject matter of Example 27 optionally includes wherein the entry of an inter-pupillary distance is performed before presenting the user with the series of test images.

In Example 29, the subject matter of any one or more of Examples 26-28 optionally include means for presenting the user of the head worn device with a second series of test images, the test images to be projected in at least two vertically adjacent recording zones of the head worn device; means for repeating the determining of the eyebox location and sending the eyebox location, based in part on user responses to the second series of test images.

Example 30 is a method for providing virtual images to a user, the method comprising: projecting a virtual image on a holographic lens in a projection area of the holographic lens, wherein the projection area includes at least two vertically adjacent recording zones, and wherein the projector is to project the virtual image into the at least two vertically adjacent recording zones, wherein an eyebox for the user is based in part on a pantoscopic tilt angle of the user's pupil with respect to the holographic lens, and an eye relief distance measurement of the user's eye surface with respect to the holographic lens, and wherein the eyebox corresponds to at least one of the at least two vertically adjacent recording zones.

In Example 31, the subject matter of Example 30 optionally includes wherein the projector is a microelectromechanical system using holographic technique for projection.

In Example 32, the subject matter of any one or more of Examples 30-31 optionally include wherein responsive to a selection of one of the at least two vertically adjacent recording zones that corresponds to the eyebox, the method further comprises disabling projection into each vertically adjacent recording zone that has not been selected, wherein disabling is to turn off a light source of the projector when projecting into unselected recording zones.

In Example 33, the subject matter of Example 32 optionally includes wherein the projecting further comprises: painting a continuous scan into the projection area, wherein a complete scan pass includes painting the virtual image successively in one pass for each of the vertically adjacent recording zones in the projection area, and wherein disabling of a recording zone is to turn off the light source during the scan of the unselected recording zones, and turn on the light source during the scan of the selected recording zone in each scan pass.

In Example 34, the subject matter of any one or more of Examples 30-33 optionally include wherein responsive to a selection of more than one of the at least two vertically adjacent recording zones that corresponds to the eyebox, disabling projection into each vertically adjacent recording zone that has not been selected, wherein disabling is to turn off a light source of the projector when projecting into unselected recording zones.

In Example 35, the subject matter of Example 34 optionally includes wherein the more than one of the at least two vertically adjacent recording zones is selected, responsive to an indication that the user is able to see the more than one of the at least two vertically adjacent recording zones, and wherein the projector is to project a different image to at least one of the selected vertically adjacent recording zones.

In Example 36, the subject matter of any one or more of Examples 30-35 optionally include selecting the vertically adjacent recording zone corresponding to the eyebox, responsive to receiving a user selection.

In Example 37, the subject matter of Example 36 optionally includes selecting a horizontal location of the eyebox for projection in the selected vertically adjacent recording zone based on a received horizontal image shift information corresponding to the user's inter-pupillary distance.

In Example 38, the subject matter of any one or more of Examples 36-37 optionally include dynamically adjusting the eyebox location, responsive to identifying eye gaze or head tilt of the user.

In Example 39, the subject matter of any one or more of Examples 30-38 optionally include automatically selecting the vertically adjacent recording zone corresponding to the eyebox.

In Example 40, the subject matter of any one or more of Examples 30-39 optionally include projecting the virtual image onto at least two horizontally adjacent areas in each vertically adjacent recording zone, wherein the projection to each horizontally adjacent area is at a wavelength different from another horizontally adjacent area in the same vertically adjacent recording zone.

In Example 41, the subject matter of Example 40 optionally includes disabling projection into each vertically adjacent recording zone that has not been selected, responsive to a selection of one of the at least two vertically adjacent recording zones that corresponds to the eyebox, wherein disabling is to turn off a light source of the projector when projecting into unselected recording zones, and continuing to project into each of the horizontally adjacent areas in the selected recording zone to accommodate left and right movement of the user's gaze.

In Example 42, the subject matter of Example 41 optionally includes wherein the projecting into the projection area comprises: painting a continuous scan into the projection areas, wherein a complete scan pass includes painting the virtual image successively in one pass for each of the vertically adjacent recording zones in the projection area, and wherein disabling of a recording zone is to turn off the light source during the scan of the unselected recording zones, and turn on the light source during the scan of the selected recording zone in each scan pass.

In Example 43, the subject matter of any one or more of Examples 40-42 optionally include selecting the vertically adjacent recording zone corresponding to the eyebox, responsive to receiving a user selection, and wherein the user selection also includes information corresponding to the user's inter-pupillary distance.

In Example 44, the subject matter of any one or more of Examples 40-43 optionally include automatically selecting the vertically adjacent recording zone corresponding to the eyebox is performed.

In Example 45, the subject matter of any one or more of Examples 30-44 optionally include wherein the holographic lens is positioned so that a first eye of the user may view the eyebox, and wherein the head worn device further comprises, a second optical lens for a second eye of the user, and wherein projection to the eyebox is based at least on an inter-pupillary distance for the first and second eye of the user, optics characteristics of the head worn device, and user preferences.

Example 46 is a non-transitory computer readable storage medium, having instructions stored thereon, the instructions when executed on a head worn device, cause the device to perform that acts of any of Examples 30 to 45.

Example 47 is a system configured to perform operations of any one or more of Examples 1-46.

Example 48 is a method for performing operations of any one or more of Examples 1-46.

Example 49 is at least one machine readable medium including instructions that, when executed by a machine cause the machine to perform the operations of any one or more of Examples 1-46.

Example 50 is a system comprising means for performing the operations of any one or more of Examples 1-46.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A head worn device for providing virtual images to a user, comprising:
   a holographic lens coupled to the head worn device, the holographic lens positioned to enable the user to view a virtual image on the holographic lens; and
   a scanning projector including a light source and a movable scan mirror, the projector coupled to the head worn device to project the virtual image onto the holographic lens in a projection area of the holographic lens by the scan mirror scanning light from the light source over the projection area as a continuous scan pass, wherein the projection area includes at least two vertically adjacent recording zones, and wherein the projector is to project the virtual image into the at least two vertically adjacent recording zones, wherein a complete scan pass includes scanning the virtual image successively in one scan pass for each of the vertically adjacent recording zones in the projection area, wherein an eyebox for the user is based in part on a pantoscopic tilt angle of the user's pupil with respect to the holographic lens, and an eye relief distance measurement of the user's eye surface with respect to the holographic lens, and wherein the eyebox corresponds to at least one of the at least two vertically adjacent recording zones and wherein responsive to a selection of one of the at least two vertically adjacent recording zones that corresponds to the eyebox, the light source to be turned off during the scan of the unselected recording zones, and the light source to be turned on during the scan of the selected recording zone in each scan pass.

2. The device as recited in claim 1, wherein the projector is a microelectromechanical system using holographic technique for projection.

3. The device as recited in claim 1, wherein responsive to a selection of more than one of the at least two vertically adjacent recording zones that corresponds to the eyebox, the light source to be turned off during the scan of each vertically adjacent recording zone that has not been selected, and the light source to be turned on during the scan of each selected recording zone in each scan pass.

4. The device as recited in claim 3, wherein the more than one of the at least two vertically adjacent recording zones is selected, responsive to an indication that the user is able to see the more than one of the at least two vertically adjacent recording zones, and wherein the projector is to project a different image to at least one of the selected vertically adjacent recording zones.

5. The device as recited in claim 1, wherein selection of the vertically adjacent recording zone corresponding to the eyebox is responsive to receiving a user selection.

6. The device as recited in claim 5, wherein selection of a horizontal location of the eyebox for projection in the selected vertically adjacent recording zone is based on a received horizontal image shift information corresponding to the user's inter-pupillary distance.

7. The device as recited in claim 5, wherein the eyebox location is to be dynamically adjusted, responsive to identifying eye gaze or head tilt of the user.

8. The device as recited in claim 1, wherein selection of the vertically adjacent recording zone corresponding to the eyebox is performed automatically.

9. The device as recited in claim 1, wherein the projector further comprises: a wavelength generator to project the virtual image onto at least two horizontally adjacent areas in each vertically adjacent recording zone, wherein the projection to each horizontally adjacent area is at a wavelength different from another horizontally adjacent area in the same vertically adjacent recording zone.

10. The device as recited in claim 9, wherein selection of the vertically adjacent recording zone corresponding to the eyebox is responsive to receiving a user selection, and wherein the user selection also includes information corresponding to the user's inter-pupillary distance.

11. The device as recited in claim 9, wherein selection of the vertically adjacent recording zone corresponding to the eyebox is performed automatically.

12. The device as recited in claim 1, wherein the holographic lens is positioned so that a first eye of the user may view the eyebox, and wherein the head worn device further comprises, a second optical lens for a second eye of the user, and wherein projection to the eyebox is based at least on an inter-pupillary distance for the first and second eye of the user, optics characteristics of the head worn device, and user preferences.

13. At least one non-transitory computer readable medium having instructions stored thereon, the instructions when executed on a head worn device cause the head worn device to:

project a virtual image on a holographic lens in a projection area of the holographic lens, by a scan mirror of a projector scanning light from a light source of the projector over the projection area as a continuous scan pass, wherein the projection area includes at least two vertically adjacent recording zones, and wherein the projector is to project the virtual image into the at least two vertically adjacent recording zones, wherein a complete scan pass includes scanning the virtual image successively in one scan pass for each of the vertically adjacent recording zones in the projection area, wherein an eyebox for the user is based in part on a pantoscopic tilt angle of the user's pupil with respect to the holographic lens, and an eye relief distance measurement of the user's eye surface with respect to the holographic lens, and wherein the eyebox corresponds to at least one of the at least two vertically adjacent recording zones and wherein responsive to a selection of one of the at least two vertically adjacent recording zones that corresponds to the eyebox, the light source to be turned off during the scan of the unselected recording zones, and the light source to be turned on during the scan of the selected recording zone in each scan pass.

\* \* \* \* \*